United States Patent [19]

Razdan et al.

[11] Patent Number: 5,289,686

[45] Date of Patent: Mar. 1, 1994

[54] LOW NOX GAS TURBINE COMBUSTOR LINER WITH ELLIPTICAL APERTURES FOR AIR SWIRLING

[75] Inventors: Mohan K. Razdan; Jacob T. McLeroy, both of Indianapolis; Hukam C. Mongia, Carmel, all of Ind.

[73] Assignee: General Motors Corporation, Detroit, Mich.

[21] Appl. No.: 974,759

[22] Filed: Nov. 12, 1992

[51] Int. Cl.$^5$ ............................................. F23R 3/10
[52] U.S. Cl. ..................................... 60/755; 60/752
[58] Field of Search ................ 60/752, 737, 749, 732, 60/757, 758, 759, 760, 743, 755

[56] References Cited

U.S. PATENT DOCUMENTS

| | | | |
|---|---|---|---|
| Re. 23,149 | 9/1949 | Lubbock et al. | 60/760 |
| 2,638,745 | 5/1953 | Nathan | 60/759 |
| 3,046,742 | 7/1962 | Egbert et al. | |
| 3,134,229 | 5/1964 | Johnson | 60/758 |
| 3,430,443 | 3/1969 | Richardson et al. | 60/758 |
| 3,593,518 | 7/1971 | Gerrard | 60/752 |
| 3,906,718 | 9/1975 | Wood . | |
| 3,952,503 | 4/1976 | Fox et al. | 60/757 |
| 4,292,801 | 10/1981 | Wilkes et al. | 60/39.06 |
| 4,301,657 | 11/1981 | Penny | 60/748 |

FOREIGN PATENT DOCUMENTS

| | | | |
|---|---|---|---|
| 1116416 | 1/1982 | Canada | 60/752 |
| 876495 | 5/1953 | Fed. Rep. of Germany | 60/759 |
| 22620 | 2/1977 | Japan | 60/748 |
| 985058 | 3/1965 | United Kingdom | 60/752 |
| 2079926 | 1/1982 | United Kingdom | 60/752 |

OTHER PUBLICATIONS

Performance Testing of A Low Emissions, Natural--Gas Fired, Small Gas Turbine Combustor by K. O. Smith et al., published by the American Society of Mechanical Engineering and presented at the Gas Turbine and Aeroengine Congress and Expo on Jun. 4-8, 1989.

*Primary Examiner*—Richard A. Bertsch
*Assistant Examiner*—Timothy S. Thorpe
*Attorney, Agent, or Firm*—Saul Schwartz

[57] ABSTRACT

A gas turbine combustor comprises a plurality of circumferentially spaced can type combustion liners disposed between inner and outer casings of the gas turbine engine. Each combustion liner has an auxiliary set of circumferentially spaced air slots behind a set of circumferentially spaced primary air holes that introduce compressor discharge air to cool hot spots in the primary combustion zone. The air slots are set at an angle so that the compressor discharge air is admitted into the combustion liner in such a way as to induce a swirling motion in the primary combustion zone. The combustion liner also has a set of circumferentially spaced dilution air holes that are sized and located upstream far enough to maintain an acceptable exit temperature profile and acceptable low level carbon monoxide and unburned hydrocarbons emissions.

3 Claims, 5 Drawing Sheets

LOW NOX GAS TURBINE COMBUSTOR LINER WITH ELLIPTICAL APERTURES FOR AIR SWIRLING

BACKGROUND OF THE INVENTION

This invention relates generally to gas turbine engines and more particularly to combustors for gas turbine engines that have can type combustion liners.

Allison Gas Turbine Division of General Motors Corporation presently produces a state-of-the-art combustor that comprises six circumferentially spaced can type combustion liners located in an annulus formed by inner and outer engine casings. Cross over tubes interconnect the combustion liners and provide flame transfer for starting the engine. Each combustion liner has a fuel nozzle that is connected to a fuel manifold attached to an external surface of the outer engine casing.

While these gas turbine engines perform very well, new stricter air quality control regulations require significant reductions in emissions of oxides of nitrogen (NOx). At the same time emissions of carbon monoxide (CO) and unburned hydrocarbons (UHC) must be maintained at low levels.

A common way to reduce NOx emission is to inject water or steam into the combustor. However, water or steam injection generally results in increased emissions of carbon monoxide and unburned hydrocarbons. Moreover such system are costly from both installation and operational standpoints.

SUMMARY OF THE INVENTION

The object of this invention is to provide a gas turbine combustor that reduces emissions of oxides of nitrogen (NOx) while maintaining low emissions of carbon monoxide and unburned hydrocarbons in a simple, efficient and inexpensive manner. This is generally achieved by selectively introducing compressor discharge air into the high temperature region of the combustor to quench hot spots and thereby reduce NOx emissions.

A feature of the invention is that the combustion liner has a set of circumferentially spaced slots behind the primary air holes that introduce compressor discharge air into the primary combustion zone to quench hot spots and thereby reduce NOx emissions.

Another feature of the invention is that the combustion liner has a set of circumferentially spaced quench air slots behind the primary air holes that are set at an angle so that compressor discharge air is introduced into the primary combustion zone of the combustion liner in such a way as to induce a swirling motion in the primary combustion zone.

Yet another feature of the invention is that the combustion liner has a set of circumferentially spaced dilution air holes that are sized and located upstream far to maintain an acceptable exit temperature profile.

Still yet another feature of the invention is that the combustion liner can be retrofitted into existing gas turbine engines without requiring any significant structural changes in the gas turbine engine.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
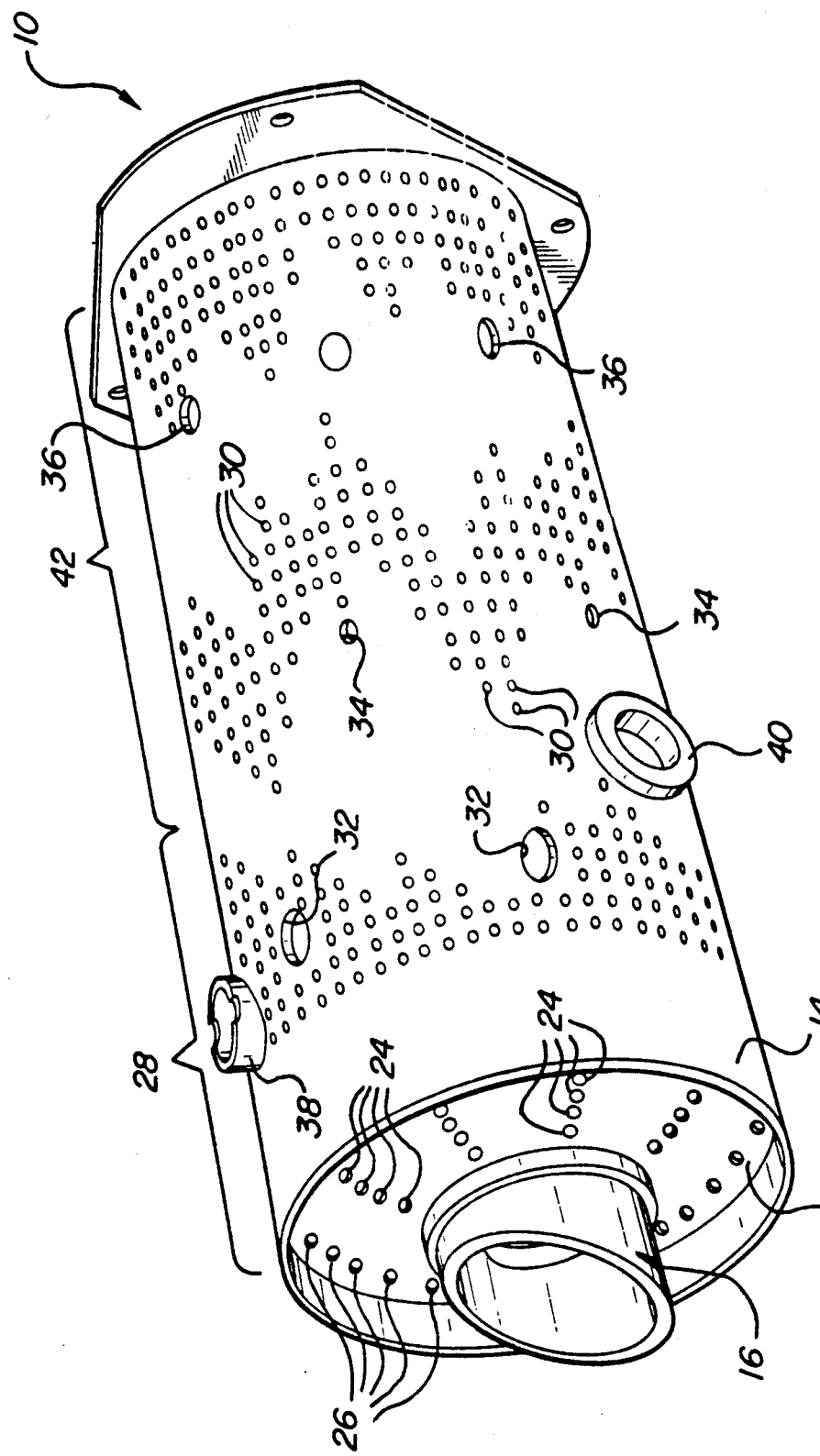
FIG. 1 is a perspective view of a prior art combustor liner.

Referring now to the drawings and more particularly to FIGS. 1 through 4, the Allison Gas Turbine prior art combustion liner 10 comprises a dome 12 at an upstream end of a cylindrical wall 14 that is open at the downstream end. The dome 12 has a concentric axial swirler 16 for introducing compressor discharge air represented by arrows 15 into the combustion liner 10 as primary air. The axial swirler 16 has a central ferrule 17 that mounts the tip of the fuel nozzle 18 on the centerline of the liner so the fuel mixes with the primary air that flows through the axial swirler. The fuel nozzle 18 is a well known duplex type fuel nozzle and need not be described in detail.

The inside of the dome 12 has eight equally spaced dome louvers 20 and an outer cooling baffle 22. The louvers direct cooling air that is received through eight radial arrays of four cooling holes 24 while the outer cooling baffle 22 directs cooling air that is received through thirty six cooling holes 26 that are circumferentially spaced around the outer periphery of the dome 12.

Figure 3:
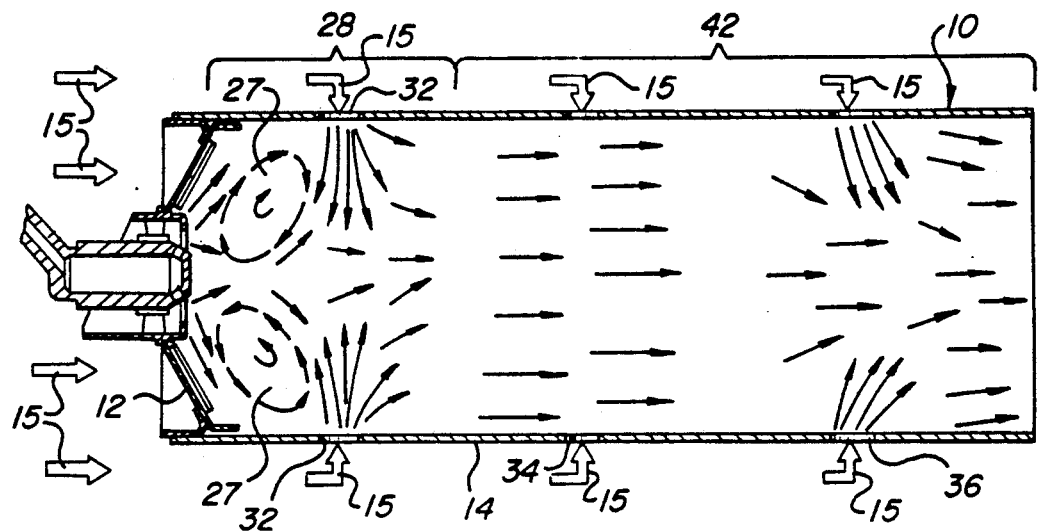
FIG. 3 is a representative longitudinal section of the prior art combustion liner of FIG. 1 showing the flow characteristics.

The axial swirler 16 and dome louvers 20 contribute to generation of recirculating flow pattern 27 in a primary combustion zone 28 that is located downstream from the dome where combustion of fuel and air is stabilized as shown in FIG. 3.

The cylindrical wall 14 is cooled using effusion cooling design. It is provided with several thousand small diameter holes 30 that are laser drilled at a small angle with respect to the wall 14. The effusion hole pattern is optimized to produce uniform wall temperature.

The cylindrical wall 14 also has three sets of air holes 32, 34 and 36. Each set consists of six equally circumferentially spaced air holes. The first set 32 is at the upstream end of the combustion liner 12 near the dome 12 and slightly behind a ferrule 38 for inserting and securing an igniter (not shown) in the combustion liner. The igniter may be any suitable igniter of conventional design for initiating combustion of the fuel and air mixture in primary combustion zone 28.

The first set of air holes 32 also introduce compressor discharge air 15 into the combustion liner 10 as primary air to mix with the fuel and air mixture from the swirler 16. The primary air introduced through air holes 32 helps generate the recirculating flow pattern 27 shown in FIG. 3 and stabilizes combustion in the primary combustion zone 28 that typically comprises the combustor volume between the dome 12 and a plane midway between the first and second sets of air holes 32 and 34.

Figure 4:
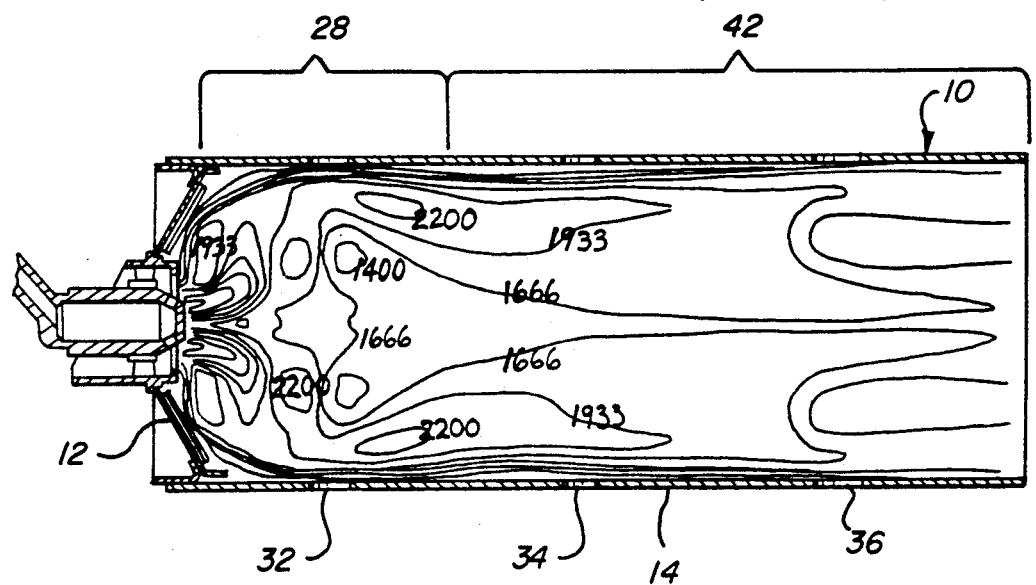
FIG. 4 is a representative longitudinal section of the prior art combustion liner of FIG. 1 showing the operating temperature characteristics.
Figure 5:
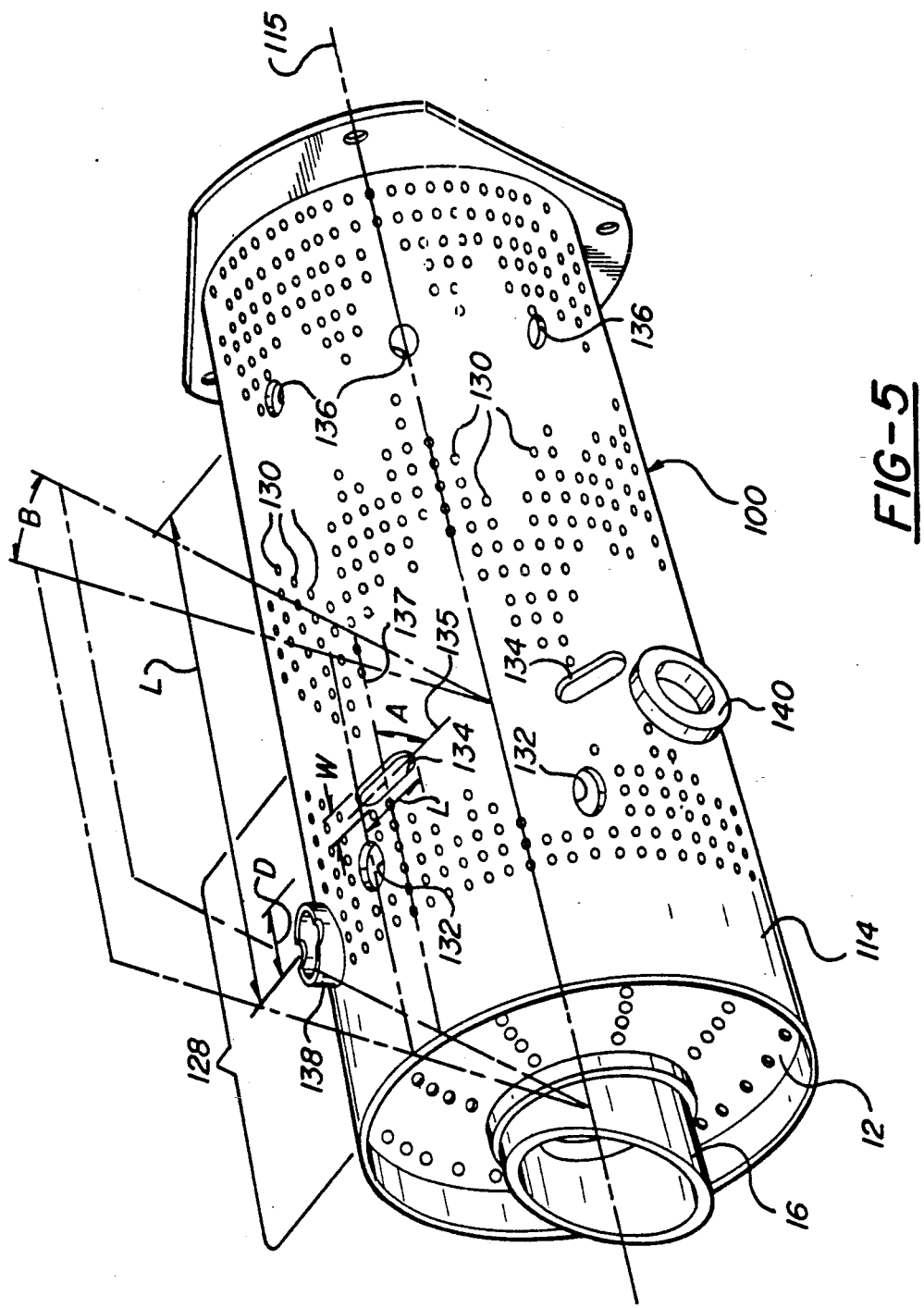
FIG. 5 is a perspective view of a combustion liner according to the invention.

The primary combustion zone 28 operates close to stoichiometric conditions at the design point in order to maintain good stability over the entire operating range. This is demonstrated in FIG. 4 which shows the temperature field of the combustor liner 10 in a gas turbine engine operating at full power with the values of the temperature lines being in degrees Kelvin. Most of the combustion takes place in the primary combustion zone 28 under the diffusion mode of operation as shown in FIG. 4. The large regions of near stoichiometric flame temperature (1993 degrees Kelvin and above) are for the most part responsible for the production of high thermal NOx which has an exponential dependency on temperature.

The cylindrical wall 14 has a crossover ferrule 40 in the primary combustion zone behind the first set of holes 32. The crossover ferrule 40 is used to attach the flame tube that is discussed above.

The second set of circumferentially spaced air holes 34 are downstream from the first set of air holes 32 and the primary combustion zone 28. The second set introduces compressor discharge air 15 into the combustion liner 10 as secondary or dilution air to mix with the combustion products from the primary combustion zone 28 in a secondary air zone 42 as shown in FIG. 3. This secondary air cools or quenches the combustion products and burns any unburned hydrocarbons to complete the combustion process as shown by the temperature profile in FIG. 4.

The air holes 34 of the second set are located half way between the holes 32 of the first set in the circumferential direction and they are considerably smaller in size.

The third set of air holes 36 are about halfway between the secondary air holes 34 and the exit of the combustion liner 10. The third set of air holes 36 introduce still more compressor discharge air 15 into the combustion liner 10 as more secondary air to dilute and cool the mixture of combustion products and secondary air from the air holes 34 further as shown in FIGS. 3 and 4.

The dilution air holes 36 of the third set are located in alignment with the primary air holes 32 of the first set in the circumferential direction and they vary in size around the circumference to produce a relatively uniform exit temperature pattern in the product gases before introduction into the gas turbine vanes. Typically 35% of the compressor discharge air is used as primary air, 25% for secondary or dilution air, and 40% for liner wall cooling.

Figure 2:
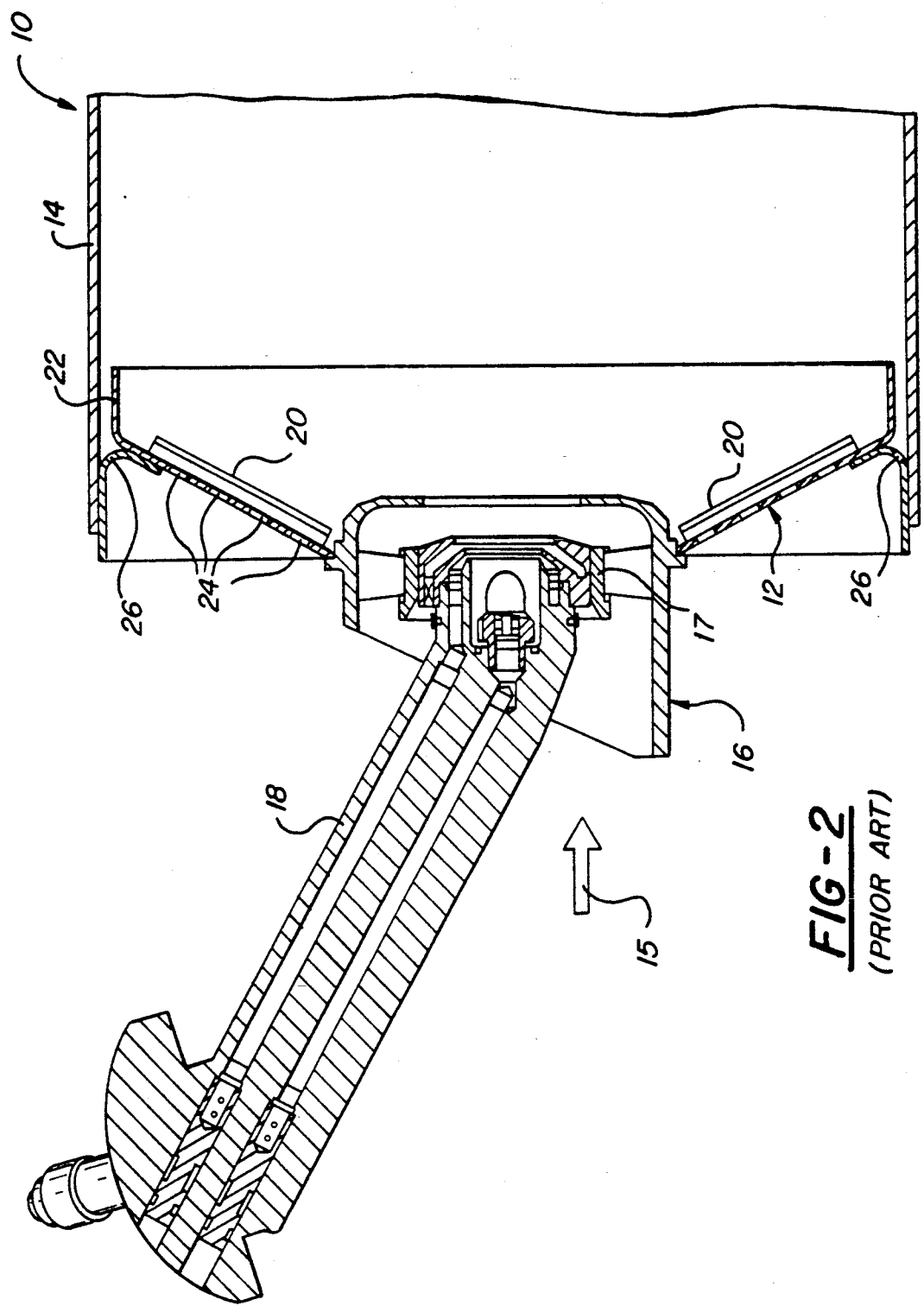
FIG. 2 is a fragmentary longitudinal section of the common dome end of the prior art combustion liner shown in FIG. 1 and the combustion liner of this invention that is shown in FIGS. 5, 6 and 7.

Referring now to FIGS. 2 and 5 through 7, the combustion liner 100 of this invention comprises a dome 12 at an upstream end of a cylindrical wall 114 that is open at the downstream end. The cylindrical wall 114 has a longitudinal centerline 115, FIG. 5. The dome 12 is identical to the dome 12 of combustion liner 10 that is shown in FIG. 2 and the dome 12, concentric axial swirler 16 and fuel nozzle 18 operate in the same way.

The cylindrical wall 114 is also cooled using effusion cooling design and consequently it is also provided with several thousand small diameter holes 130 that are laser drilled at a small angle with respect to the wall 114. The effusion hole pattern is optimized to produce uniform wall temperature.

The cylindrical wall 114 of the combustion liner 100 of the invention also has three sets of six equally circumferentially spaced air holes 132, 134 and 136. The first set of air holes 132 is the same as the first set of primary air holes 32 of the prior art combustion liner 10. That is, the air holes 132 are at the upstream end of the combustion liner 100 near the dome 12 and slightly behind a ferrule 138 for inserting and securing an igniter of conventional design (not shown) in the combustion liner 100 for initiating combustion of the fuel and air mixture in a primary combustion zone 128. As before, the first set of air holes 132 introduce compressor discharge air set 132 into the combustion liner 100 as primary air to mix with the fuel and air mixture from the swirler 16 to stabilize combustion in the primary combustion zone 128. The cylindrical wall 114 also has a crossover ferrule 140 in the primary combustion zone 128 behind the first set of air holes 132 for attaching a flame tube (not shown).

Figure 6:
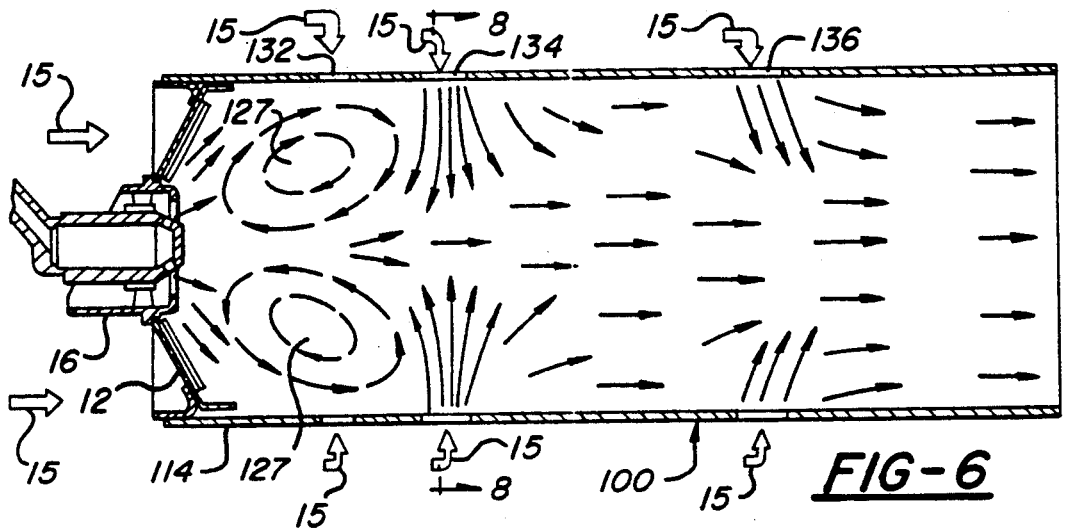
FIG. 6 is a representative longitudinal section of the combustion liner of the invention showing the flow characteristics.
Figure 7:
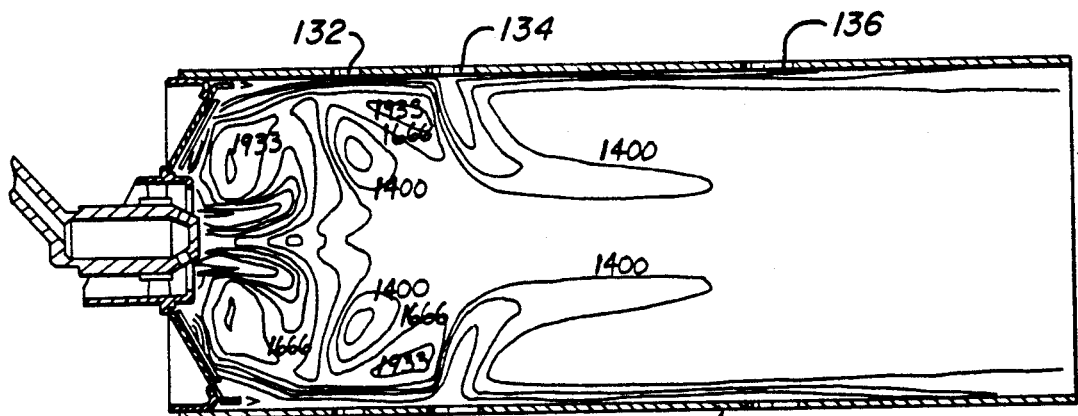
FIG. 7 is a representative longitudinal section of the combustion liner of the invention showing the temperature characteristics.
Figure 8:
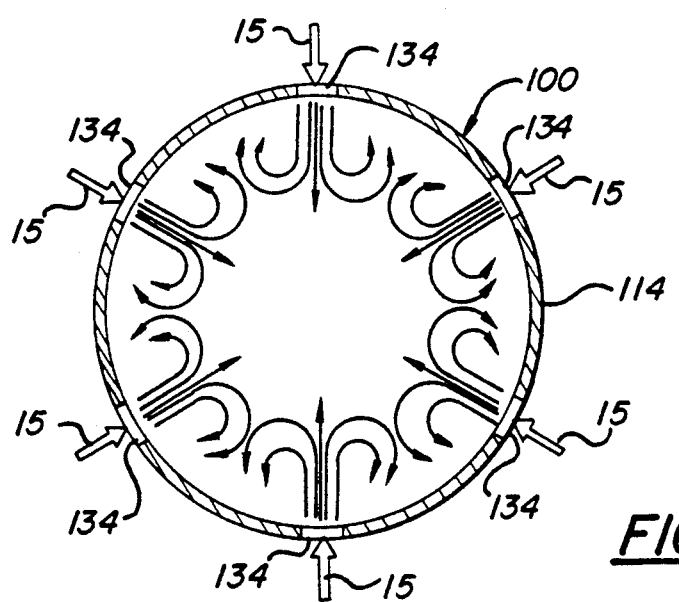
FIG. 8 is a section taken substantially along the line 8—8 of FIG. 6 looking in the direction of the arrows.

The combustion liner 100 differs from the prior art combustion liner 10 primarily in that the second set of circumferentially spaced air holes 34 are replaced by enlarged air slots 134 that are located closer to the primary air holes 132 and in the primary combustion zone 128. Each enlarged air slot 134 has a length dimension L in the direction of a major axis 135 thereof and a width dimension W perpendicular to the major axis 135 and less than the length dimension L. These enlarged air slots 134 introduce compressor discharge air 15 into the combustion liner 100 so that part of the air flows upstream to create a recirculation flow 127 of increased length as shown in FIG. 6. This introduction of secondary air into the primary combustion zone 128 through the slots 134 in close proximity to the primary air holes 132 also quenches hot spots in the primary combustion zone as demonstrated in FIG. 7. FIG. 7 shows the temperature field of the combustor liner 100 in the same gas turbine engine as that used for FIG. 4 operating at full power with the values of the temperature lines also being in degrees Kelvin. FIG. 7 shows a substantial reduction in the regions of near stoichiometric flame temperature (1933 degrees Fahrenheit and above) to two small regions at the dome 12 and just ahead of the plane of the slots 134 respectively. This substantial reduction of hot spots in the combustion liner 100 reduces NOx emissions to low levels because the production of high thermal NOx has an exponential dependence on temperature as indicated above.

We have found that in a combustion liner that is about 5.5 inches in diameter and about 14.0 inches long, the enlarged air slots 134 may be located a distance of about 0.9 inches to about 2.0 inches and preferably about 2.0 inches downstream from the first set of primary air holes 132.

The enlarged air slots 134 are preferably set at an angle A defined between the major axis 135 of each air slot and a line 137 in the cylindrical wall 114 parallel to the longitudinal centerline 115 of the cylindrical wall so that the air enters the combustion liner 100 in such a way as to induce a swirling motion in the primary combustion zone that is in the same direction as that produced by the swirler 16. We have found that slots having a length to width ratio L/W of approximately 2.0 and set at an L . angle A of about 60 degrees are suitable. We have also found that the slots 134 can be indexed at an angle B of about 10 degrees from the air holes 132 in the same direction about the longitudinal centerline 115 as the gas swirl that is produced by the swirler 16. This introduces the secondary air into the combustion liner 100 in jets that are directly in line with the jets of primary air that are introduced through the holes 132 when the swirling motions produced by the swirler 16 are taken into account. This indexing also accommodates the crossover ferrule 140.

The third set of air holes 136, that is the dilution air holes may remain at the same location in the combustion liner 10 that is, about 8.3 inches downstream from the first set of air holes 132 for improved reduction of oxides of nitrogen. However further improvements may be realized if the dilution air holes 136 are moved forward toward the dome 12 to compensate for decreased air flow. In this regard we have found that the dilution air holes 136 can be moved forward about 2.4 inches so that the dilution air holes 136 are about 5.9 inches downstream from the first set of primary air holes 132.

The forward disposition of dilution air holes 136 increases the length and time to the exit of the combustion liner 100. This reduces the level of unburned hydrocarbons and evens out the exit temperature pattern. Moreover the dilution air holes 136 can be enlarged to reduce variation in the exit temperature pattern further.

As before, the dilution air holes 136 of the third set are aligned with the primary holes 132 in the circumferential direction and they vary in size around the circumference to produce a more uniform exit temperature pattern in the product gases before introduction into the gas turbine vanes.

Through testing we have found that the combustion liner of this invention can reduce emissions of oxides of nitrogen (NOx) better than 35% in comparison to the prior art combustion liner that is discussed above and that forms the starting point for this invention. Moreover, the testing indicates that the combustion liner of this invention has excellent performance with respect to low carbon monoxide and unburned hydrocarbon emissions that compares favorably with the performance of the prior art combustion liner in this regard particularly when the dilution air holes are moved forward as described above.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A can type combustion liner for a gas turbine engine combustor comprising:
    a cylindrical wall having a dome at an upstream end and an exit opening at a downstream end,
    the dome having a fuel inlet at the upstream end and a swirler around the fuel inlet for introducing swirl air into the combustion liner adjacent the fuel inlet,
    a plurality of circumferentially spaced primary air holes in the cylindrical wall that are located downstream of the fuel inlet for introducing primary air into the combustion liner to stabilize and substantially complete combustion within a primary combustion zone, and
    a plurality of circumferentially spaced air slots in the cylindrical wall that are located downstream from the primary air holes and in the primary combustion zone for introducing compressor discharge air into the combustion liner to cool hot spots in the primary combustion zone,
    each of the air slots having a length dimension in the direction of a major axis thereof exceeding a width dimension of the slot perpendicular to the major axis, and
    each of the major axes intercepting an angle in a range of between zero degrees and 90 degrees relative to a corresponding one of a plurality of lines in the cylindrical wall each parallel to a longitudinal centerline of the cylindrical wall and intersecting respective ones of the major axes of the air slots so that compressor discharge air entering the primary combustion zone through the air slots induces a swirling motion in the primary combustion zone.

2. The combustion liner as defined in claim 1 wherein the swirling motion in the primary combustion zone induced by the compressor discharge air entering the primary combustion zone through the air slots is in the same direction as the swirl of the swirl air introduced into the combustion liner through the swirler around the fuel inlet.

3. The combustion liner as defined in claim 2 wherein the air slots have a length to width ratio of approximately 2.0

* * * * *